United States Patent
Bahlmann et al.

(10) Patent No.: US 11,078,605 B2
(45) Date of Patent: Aug. 3, 2021

(54) METHOD FOR OPERATING A SPINNING MACHINE OR WINDER

(71) Applicant: Maschinenfabrik Rieter AG, Winterthur (CH)

(72) Inventors: Bernd Bahlmann, Schrobenhausen (DE); Franz Huettinger, Geisenfeld (DE)

(73) Assignee: Maschinenfabrik Rieter AG, Winterthur (CH)

( * ) Notice: Subject to any disclaimer, the term of this patent is extended or adjusted under 35 U.S.C. 154(b) by 278 days.

(21) Appl. No.: 16/242,599

(22) Filed: Jan. 8, 2019

(65) Prior Publication Data
US 2019/0211481 A1   Jul. 11, 2019

(30) Foreign Application Priority Data
Jan. 9, 2018  (DE) .................... 10 2018 100 364.1

(51) Int. Cl.
| | |
|---|---|
| *D01H 4/42* | (2006.01) |
| *D01H 1/28* | (2006.01) |
| *B65H 54/22* | (2006.01) |
| *B65H 63/00* | (2006.01) |

(52) U.S. Cl.
CPC .............. *D01H 4/42* (2013.01); *B65H 54/22* (2013.01); *B65H 63/00* (2013.01); *D01H 1/28* (2013.01); *B65H 2551/20* (2013.01); *B65H 2701/31* (2013.01); *G05B 2219/45191* (2013.01)

(58) Field of Classification Search
CPC . D01H 4/42; D01H 1/28; D01H 13/14; B65H 54/22; B65H 54/00; H04L 29/08099

USPC .......................................... 700/130, 138, 140
See application file for complete search history.

(56) References Cited

U.S. PATENT DOCUMENTS

| | | | | |
|---|---|---|---|---|
| 4,964,031 A | * | 10/1990 | Gotoh ................ | G05B 19/0428 139/1 R |
| 5,046,013 A | * | 9/1991 | Ueda ...................... | D03D 33/00 700/139 |
| 5,590,045 A | * | 12/1996 | Kaak ...................... | D01H 13/32 57/264 |

(Continued)

FOREIGN PATENT DOCUMENTS

| | | |
|---|---|---|
| DE | 40 08 794 A1 | 9/1990 |
| DE | 199 30 714 A1 | 1/2001 |

(Continued)

OTHER PUBLICATIONS

German Patent Office Search Report, dated Nov. 26, 2018.
EPO Search Report, dated Jul. 3, 2019.

*Primary Examiner* — Khoa D Huynh
*Assistant Examiner* — Grace Huang
(74) *Attorney, Agent, or Firm* — Dority & Manning, P.A.

(57) ABSTRACT

A method is provided for operating a spinning machine or winder that includes a plurality of same-kind workstations and a plurality of input terminals situated with the workstations. The method includes at least intermittently configuring at least one of the input terminals as a master terminal. Commands are entered for operation of all or a group of the workstations via the master terminal. Designation of the master terminal is changed to one or more different ones of the input terminals at different points in time. A spinning machine or winder that practices the method is also provided.

7 Claims, 1 Drawing Sheet

(56) References Cited

U.S. PATENT DOCUMENTS

| | | | | |
|---|---|---|---|---|
| 5,748,481 A * | 5/1998 | Nakade | ............... | B65H 63/06 |
| | | | | 57/264 |
| 6,556,885 B2 * | 4/2003 | Hosel | ............... | D01G 31/00 |
| | | | | 112/155 |
| 6,574,526 B1 * | 6/2003 | Gaukler | ............... | D01H 1/16 |
| | | | | 700/139 |
| 6,708,076 B2 * | 3/2004 | Zhang | ............... | D05C 5/00 |
| | | | | 112/102.5 |
| 6,807,457 B2 * | 10/2004 | Natali | ............... | D03D 51/007 |
| | | | | 700/140 |
| 8,180,475 B2 * | 5/2012 | Taguchi | ............... | D05C 5/04 |
| | | | | 700/138 |
| 8,224,496 B2 * | 7/2012 | Musti | ............... | G06F 1/3209 |
| | | | | 700/295 |
| 8,639,666 B2 * | 1/2014 | Densham | ............ | G05B 17/02 |
| | | | | 707/687 |
| 10,474,591 B2 * | 11/2019 | Kagan | ............... | G06F 13/12 |

FOREIGN PATENT DOCUMENTS

| | | | | |
|---|---|---|---|---|
| DE | 10 2014 008 802 A1 | 12/2015 | | |
| EP | 0389849 A2 * | 10/1990 | ............ | D01H 13/14 |
| EP | 1 065 303 A1 | 1/2001 | | |
| EP | 2 108 723 A2 | 10/2009 | | |
| EP | 2562114 A2 * | 2/2013 | ............ | D01H 13/14 |
| EP | 2573635 A1 * | 3/2013 | ............ | D01H 13/14 |
| EP | 3 162 930 A1 | 5/2017 | | |
| EP | 3 170 778 A1 | 5/2017 | | |

* cited by examiner

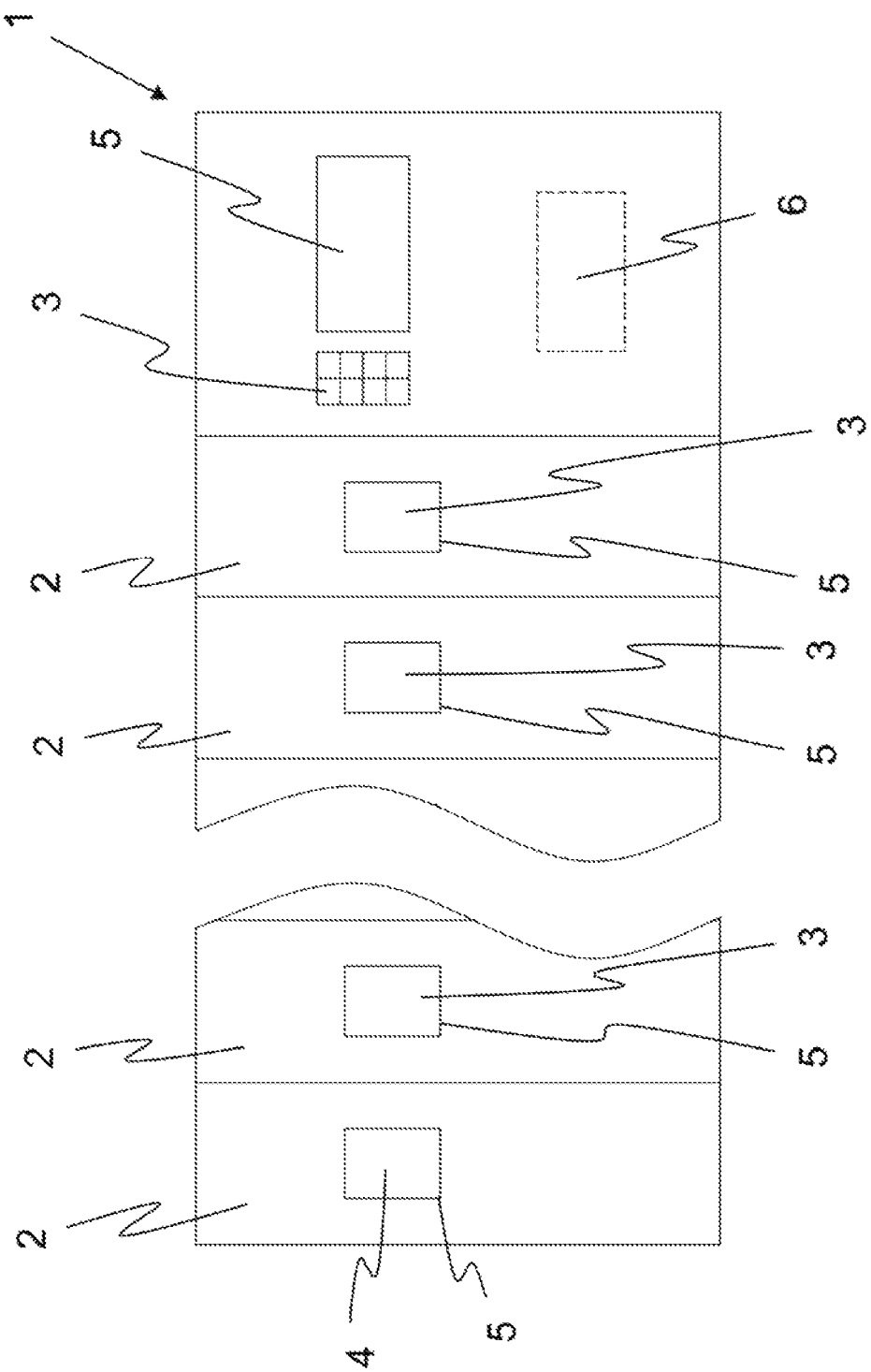

METHOD FOR OPERATING A SPINNING MACHINE OR WINDER

FIELD OF THE INVENTION

The present invention relates to a method for operating a spinning machine or winder having a plurality of workstations of the same kind and multiple input terminals situated in the region of the workstations, wherein at least one input terminal acts, at least intermittently, as the master terminal, and wherein commands for the operation of several of the workstations are entered via the master terminal. Moreover, the invention relates to an appropriate spinning machine or winder.

The invention also relates to a spinning machine or winder having a plurality of workstations of the same kind and multiple input terminals situated in the region of the workstations, wherein at least one input terminal acts, at least intermittently, as the master terminal, and wherein commands for the operation of several of the workstations can be issued via the master terminal.

BACKGROUND

Spinning machines or winders comprising a plurality of workstations of the same kind, at each of which a thread is produced and/or is rewound from one sleeve to another sleeve, are known. In the past, the workstations of such a textile machine were jointly driven and, therefore, centrally controlled. A keypad situated at the central control system was usually utilized for manually entering control commands. Recently, the development of textile machines is headed in the direction of equipping each of the workstations with single drives and, therefore, making each of the workstations increasingly independent of one another. Thus, potentially all workstations of a spinning machine or winder can be operated independently of one another using different parameters and, in the case of spinning machines, threads having different properties can be produced. In order to be able to utilize this potential, it is important to efficiently control the individual workstations and provide the appropriate personnel with the option to operate the workstations individually.

To this end, DE 199 30 714 A1 describes a textile machine having workstations, each of which includes an individual control system, at least one individual display device, and one multi-function control button. The multi-function control button is utilized primarily for controlling the display in this case. The aforementioned document also describes, however, that simple commands such as shutting down the workstation can be issued with the aid of the multi-function control button of the particular workstation. With respect to the aforementioned invention, it is disadvantageous that the operating personnel must be present at the site of the particular workstation in order to operate the workstation using the above-described multi-function control button.

EP 3 170 778 A1 describes a system for managing an interconnection of multiple textile machines, which comprises, inter alia, a terminal device, with the aid of which at least one of the fiber processing units of the plurality of textile machines can be managed. The terminal device of the aforementioned invention is designed, for example, as a wireless hand-held device. Such a terminal device would necessarily be battery-operated and, therefore, would have to be regularly charged or equipped with new batteries. In addition, such a terminal device is subject to problems associated with wireless data transmission, such as shading or interferences, which are not unlikely in the typical surroundings of textile machines.

The problem addressed by the present invention is therefore that of facilitating the operation of workstations of a spinning machine or winder.

SUMMARY

The problem is solved using a method and a spinning machine or winder including the features described and claimed herein. Additional objects and advantages of the invention will be set forth in part in the following description, or may be obvious from the description, or may be learned through practice of the invention.

The method provided here describes the operation of a spinning machine or winder comprising a plurality of workstations of the same kind and multiple input terminals situated in the region of the workstations. At least one input terminal acts, at least intermittently, as the master terminal, via which commands for the operation of several of the workstations of the spinning machine or winder are entered.

According to the invention, it is provided that different input terminals act as the master terminal at different points in time.

In this content, an input terminal is a device, with the aid of which the operating personnel can provide input, which can be interpreted by appropriate control units of the spinning machine or winder. In particular, keyboards or individual keys, mice, touchscreens, or a combination of the aforementioned and/or additional suitable elements form an input terminal.

A master terminal is a distinguished input terminal, the inputs of which are handled with priority with respect to other input terminals. In addition, commands for operating several of the workstations of the spinning machine or winder can be entered via the master terminal. Preferably, precisely one input terminal acts as the master terminal at each point in time. In addition, preferably an input terminal becomes the master terminal when inputs are entered at this input terminal by the operating personnel or the particular terminal is selected by the operator as the master terminal by way of appropriate inputs entered by the operator.

Due to the arrangement of multiple input terminals in the region of the workstations of the spinning machine or winder, each of which can act as the master terminal as necessary, it becomes possible for the operating personnel to individually manually control each workstation of the spinning machine or winder nearly independently of their whereabouts.

Advantageously, a display device is assigned to each input terminal, with the aid of which information regarding at least one of the workstations of the spinning machine or winder is displayed. Such a display facilitates the input of commands, due to the fact, for example, that the selection of the workstations to be controlled is facilitated and/or the effects of issued commands are displayed.

Preferably, precisely one input terminal is assigned to each display device. It is also conceivable, however, for example, that two or more input terminals are assigned to one display device or one input terminal is assigned to multiple adjacent workstations.

Advantageously, the display device has further functions, such as displaying malfunctions and/or displaying additional information regarding workstations or machines. The input terminal could also be utilized for controlling the display device in this case. In particular, text and/or icons for representing complex interrelationships is/are displayed by the display device.

It is advantageous when the commands for the operation of the workstations, which have been entered via the input terminals, are sent to a central control unit, which is connected to multiple workstations for control purposes. In particular, it would be advantageous when the commands, which have been input, would be sent to a central control unit, which is connected to all workstations of the spinning machine or winder for control purposes. As a result, subordinate control units which may be present can be omitted.

Moreover, it is advantageous when the commands for the operation of the workstations, which have been entered via the input terminals, are sent to at least one decentralized control unit, wherein the at least one decentralized control unit is connected to at least one workstation for control purposes.

In particular, it would be advantageous when the commands entered via the input terminals would be sent to workstation associated control units. As a result, it becomes possible to continue operating the spinning machine or winder largely unchanged in the event of failure of individual control units. In particular, in the case of a plurality of control units which have equality of access, and a high level of redundancy associated therewith, the spinning machine or winder can continue to be operated unchanged in the event that maintenance is performed on individual control units.

In addition, it is advantageous when the control signals resulting from the commands for the operation of the workstations, which have been entered via the input terminals, are sent from the central control unit and/or the at least one decentralized control unit to multiple workstations. Yarn is usually produced or rewound in mass production. Therefore, it is advantageous when multiple or many workstations of a spinning machine or winder are operated using the same parameters or are jointly controlled. It is also conceivable, however, to produce or rewind yarns, which have special properties and are required only in small quantities, on individual workstations and, therefore, to independently control these workstations.

For this purpose, it is also advantageous when multiple workstations are combined into one predefined group, wherein all workstations in the group are jointly controlled with the aid of the commands entered at the master terminal. The described, predefined group can be determined by hardware or software and makes it easy for the operating personnel to simultaneously control multiple workstations. Preferably, all workstations of the spinning machine or winder are subdivided into predefined groups. It is advantageous, for example, to combine the workstations of each side of the spinning machine or winder into one group. There could also be a plurality of predefined groups, each of which contains the same number of workstations. Thus, for example, four workstations could be combined into one group in each case.

In the event that the groups are established with the aid of software, it would be advantageous when the groups could be changed according to the requirements. Thus, it would be conceivable that the group assignment of the workstations can be changed or dissolved by way of inputs entered at the master terminal.

According to one advantageous embodiment of the method, an input terminal is automatically selected as the master terminal for all workstations or a defined group of workstations within the scope of a standard setting. For example, an input terminal situated on the end face of the spinning machine or winder could be established as the master terminal by default. This standard setting is similar to the related art comprising a central machine control system. Preferably, an input terminal, at which inputs are entered by the personnel, automatically becomes the master terminal without any further effort. It would also be conceivable that the master terminal can be established only manually or additionally in a manual manner. Input terminals which are not the master terminal in this case could have limited functionality, such as only the control of an assigned display.

The spinning machine or winder, which is also provided, comprises a plurality of workstations of the same kind and multiple input terminals situated in the region of the workstations, wherein at least one input terminal acts, at least intermittently, as the master terminal, and wherein commands for the operation of several of the workstations can be issued via the master terminal.

According to the invention, it is provided that multiple input terminals are designed to act as the master terminal.

By way of the master terminal, it is possible to manually control preferably any and, in particular, all workstations of the spinning machine or winder. The arrangement of multiple input terminals in the region of the workstations, preferably all of which are designed to be capable of acting as the master terminal, makes it possible for the operating personnel to individually control the workstations of the spinning machine or winder in a nearly location-independent manner.

For example, it would be conceivable to situate an input terminal at each workstation. In particular, it would also be possible to situate the input terminals distanced from one another within a certain number of workstations.

Moreover, it is advantageous for the spinning machine or winder when a display device is assigned to each input terminal. Display devices for reporting malfunctions or retrieving workstation- or machine-related data are already installed in spinning machines or winders and can be easily connected to the input terminals according to the invention. The displayed information enables the operating personnel to make well-found decisions while manually controlling the workstations. In addition, the display devices can provide direct feedback during the selection of certain workstations or during the issuance of control commands.

Preferably, precisely one input terminal is assigned to each display device. It would also be conceivable, however, that multiple input terminals share one display device.

It would also be advantageous when the input terminals are similarly utilized for controlling the display devices. For example, in this way, the type of displayed information and/or the relevant workstations could be changed by way of the input terminal. In order to be able to depict a large amount of information, the particular display device is preferably designed as a color display which can display text as well as icons. It would be conceivable to combine the input terminal and the display device, for example, in the form of a touch-sensitive screen.

It is also advantageous when several of the input terminals are fixedly connected to the spinning machine or winder. Preferably, the input terminals are also fixedly wired to the spinning machine or winder and are physically connected to their data transmission device. Therefore, the problems associated with power supply via batteries and with wireless data transmission are dispensed with. Additional wireless hand-held devices are also conceivable, however.

It is advantageous for the spinning machine or winder when the input terminals are connected in a wireless or wired manner to a central control unit which is connected to multiple workstations for control purposes. In particular, it would be advantageous when this central control unit is connected to all workstations of the spinning machine or winder for control purposes. As a result, subordinate control units can be omitted.

In addition, it is advantageous for the spinning machine or winder when the input terminals are connected to at least one decentralized control unit or comprise the decentralized control unit, wherein the particular decentralized control unit is connected to at least one workstation for control purposes. It would be advantageous, in particular, when the workstations are each connected to multiple decentralized workstations for control purposes. As a result, redundancy is established, which makes it possible to continue operating the spinning machine or winder, unchanged, in the event of failure of individual control units and/or in the event of failure of individual input terminals.

A combination of a central control unit and multiple decentralized control units would also be conceivable and would be advantageous for the spinning machine or winder, due to the combination of the advantages of the two concepts.

BRIEF DESCRIPTION OF THE DRAWINGS

The invention is explained in greater detail in the following with reference to an exemplary embodiment.

DETAILED DESCRIPTION

Figure 1:
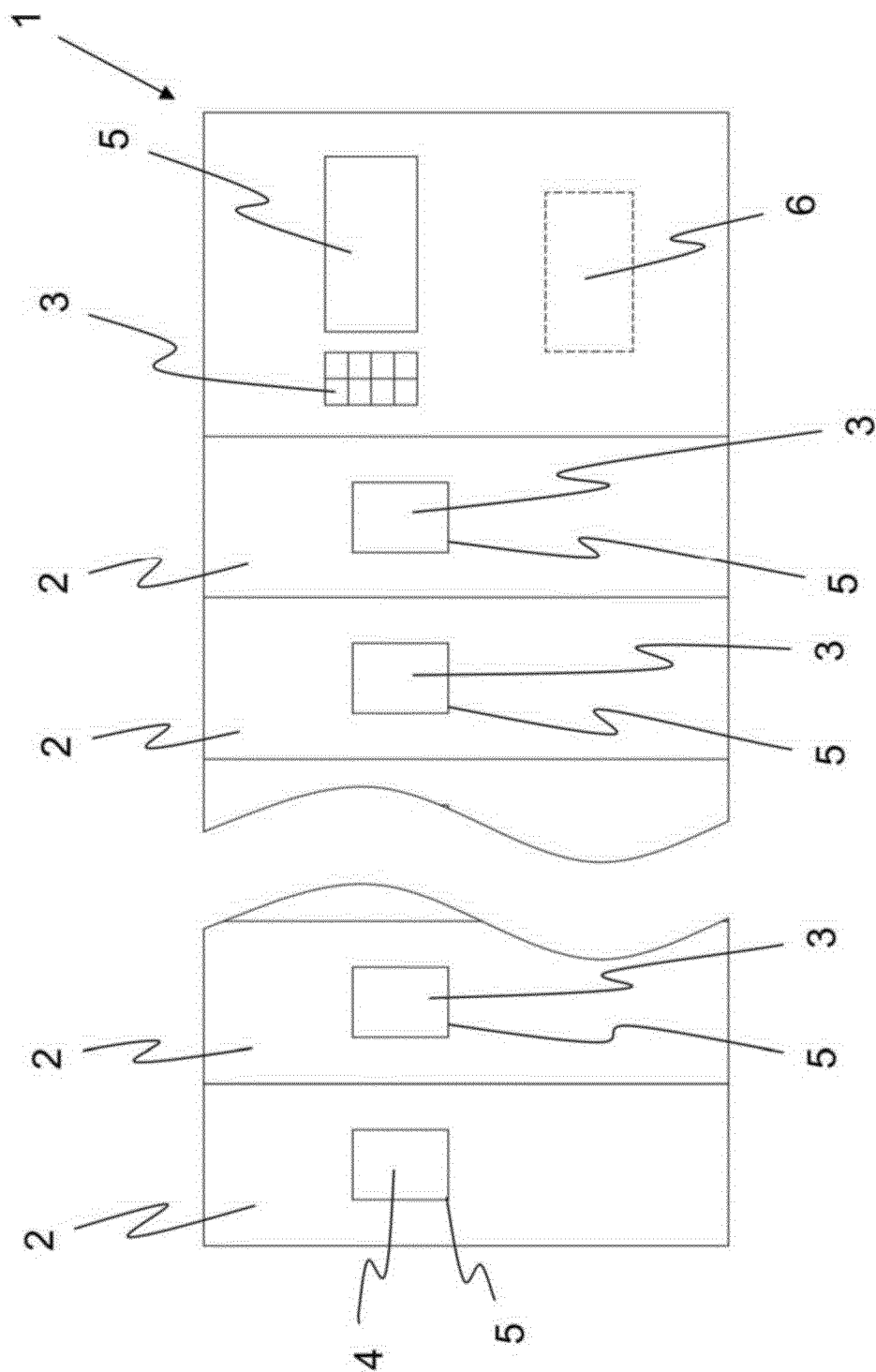
FIG. 1 shows a spinning machine or winder 1 comprising a plurality of workstations 2.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Preferably, each workstation 2 is equipped with a display device 5 and/or an input terminal 3. As a result, the path taken by the operating personnel to retrieve information and/or enter inputs is minimal.

The display device 5 and the input terminal 3 could be combined, for example, in the form of a touch-sensitive screen. This saves space at the particular workstation and nevertheless allows for complex inputs and for the display of comprehensive information.

It is also conceivable that input terminals 3 are present in various embodiments on a spinning machine or winder 1. Thus, for example, touch-sensitive screens at the workstations 2 could act as input terminals 3 and a keypad connected to a separate display device 5 could be present at the machine end.

An input terminal 3 which is similar to the related art, for example, at the machine end, makes it possible for an operating personnel, who has been trained according to the related art, to readily operate the spinning machine or winder 1 according to the invention. Preferably, any of the input terminals 3 can become a master terminal 4.

In addition, a master terminal 4 is capable of receiving commands to control preferably several and, in particular, all workstations 2 and forwarding the commands directly or via a central control unit 6 to the particular workstations 2. The establishment of a master terminal 4 takes place, for example, manually, via inputs. An input terminal 3 could also automatically become a master terminal 4 when utilized by an operating personnel. Within the scope of a standard setting, for example, the input terminal 3 at the machine end could be a master terminal 4 without having been expressly established by way of any inputs.

The input terminals 3 are connected to at least one control unit 6 for the purpose of forwarding and implementing control commands. The control commands could preferably centrally control all workstations 2 of the spinning machine or winder 1. In this case, a master terminal 4 would send control commands to the central control unit 6 which, in turn, triggers the specific implementation of the commands at the particular workstations 2.

It would also be possible that the control unit 6 is an integral part of a decentralized control system. For example, each workstation 2 could comprise one control unit 6. It would also be conceivable to assign four workstations 2 to one control unit 6 in each case. In order to create redundancy and, therefore, guard against failure of individual elements, it would be conceivable in this case to connect each workstation 2 to multiple control units 6 having equality of access.

A combination of a higher-order, central control system and subordinate, decentralized control units 6 would also be possible. In this case, an arrangement of the input terminals 3 at the decentralized control units 6 would be advantageous.

In order to facilitate the control of multiple workstations 2 by the operating personnel, multiple workstations 2 could be combined into groups, for which commands from the master terminal 4 jointly apply. The aforementioned groups can be fixedly predefined or freely defined by the operating personnel. For example, it would be advantageous to combine the workstations 2 of each side of the machine into one of the above-described groups. It is also conceivable to combine all the workstations 2 assigned to one control unit 6 into one group in each case.

Examples of commands which can be entered at a master terminal 4 are: start or shut down, start or stop automatic processes, change operating parameters, summon a service unit, establish quantity standards, and establish conditions for alarm signals for one or several workstations in each case.

The present invention is not limited to the exemplary embodiment which has been represented and described. Modifications within the scope of the patent claims are also possible, as is a combination of the features.

LIST OF REFERENCE CHARACTERS 1 spinning machine or winder
2 workstation
3 input terminal
4 master terminal
5 display device
6 control unit

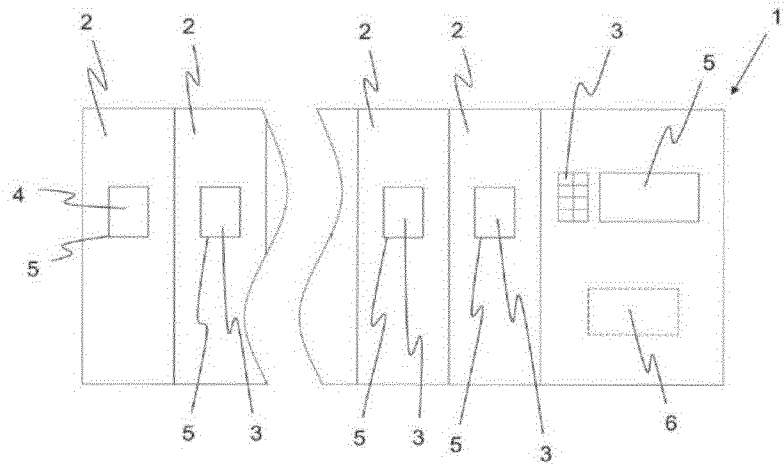

The invention claimed is:
1. A method for operating a spinning machine or winder that includes a plurality of same-kind workstations and a plurality of input terminals situated with the workstations, the method comprising:
at least intermittently, configuring at least one of the input terminals as a master terminal;
entering commands for operation of all or a group of the workstations via the master terminal;

changing the master terminal to one or more different ones of the input terminals at different points in time; and the plurality of input terminals configured at different workstation locations on the spinning machine or winder such that the changing of the master terminal to one of the input terminals is accomplished by an operating personnel from any one of the different workstation locations.

2. The method as in claim 1, wherein a display device is assigned to each input terminal, the method comprising displaying information for all or a group of the workstations at individual ones of the display devices.

3. The method as in claim 1, wherein the commands for operation of the workstations entered via the master terminal are sent to a central control unit, wherein the central control unit is connected to each of the workstations for control purposes.

4. The method as in claim 1, wherein the commands for operation of the workstations entered via the master terminal are sent to a decentralized control unit that is connected to at least one workstation for control purposes.

5. The method as in claim 1, wherein the commands for operation of the workstations entered via the master terminal are sent to a central control unit that is connected to each of the workstations or to a decentralized control unit that is connected to at least one of the workstations, and wherein the commands are sent from the central control unit or the decentralized control unit to a group of the workstations.

6. The method as in claim 1, wherein the workstations are divided into predefined groups, and the workstations within each predefined group are jointly controlled by the commands entered at the master terminal.

7. The method as in claim 1, wherein a different one of the input terminals is automatically selected as the master terminal within a scope of a standard setting.

* * * * *

UNITED STATES PATENT AND TRADEMARK OFFICE
CERTIFICATE OF CORRECTION

| | |
|---|---|
| PATENT NO. | : 11,078,605 B2 |
| APPLICATION NO. | : 16/242599 |
| DATED | : August 3, 2021 |
| INVENTOR(S) | : Bernd Bahlmann and Franz Huettinger |

It is certified that error appears in the above-identified patent and that said Letters Patent is hereby corrected as shown below:

On the Title Page

The Title page, showing the illustrative figure, should be deleted and substitute therefor the attached Title page.

In the Drawings

Please replace Fig. 1 with Fig. 1 as shown on the attached page.

Signed and Sealed this
Twenty-fifth Day of October, 2022

Katherine Kelly Vidal
*Director of the United States Patent and Trademark Office*

(12) United States Patent
Bahlmann et al.

(10) Patent No.: US 11,078,605 B2
(45) Date of Patent: Aug. 3, 2021

(54) METHOD FOR OPERATING A SPINNING MACHINE OR WINDER

(71) Applicant: Maschinenfabrik Rieter AG, Winterthur (CH)

(72) Inventors: Bernd Bahlmann, Schrobenhausen (DE); Franz Huettinger, Geisenfeld (DE)

(73) Assignee: Maschinenfabrik Rieter AG, Winterthur (CH)

(*) Notice: Subject to any disclaimer, the term of this patent is extended or adjusted under 35 U.S.C. 154(b) by 278 days.

(21) Appl. No.: 16/242,599

(22) Filed: Jan. 8, 2019

(65) Prior Publication Data
US 2019/0211481 A1    Jul. 11, 2019

(30) Foreign Application Priority Data
Jan. 9, 2018   (DE) .................. 10 2018 100 364.1

(51) Int. Cl.
*D01H 4/42*    (2006.01)
*D01H 1/28*    (2006.01)
*B65H 54/22*   (2006.01)
*B65H 63/00*   (2006.01)

(52) U.S. Cl.
CPC ............. *D01H 4/42* (2013.01); *B65H 54/22* (2013.01); *B65H 63/00* (2013.01); *D01H 1/28* (2013.01); *B65H 2551/20* (2013.01); *B65H 2701/31* (2013.01); *G05B 2219/45191* (2013.01)

(58) Field of Classification Search
CPC . D01H 4/42; D01H 1/28; D01H 13/14; B65H 54/22; B65H 54/00; H04L 29/08099
USPC .................................... 700/130, 138, 140
See application file for complete search history.

(56) References Cited

U.S. PATENT DOCUMENTS

| | | | | | |
|---|---|---|---|---|---|
| 4,964,031 A | * | 10/1990 | Gotoh | ............... | G05B 19/0428 139/1 R |
| 5,046,013 A | * | 9/1991 | Ueda | ............... | D03D 33/00 700/139 |
| 5,590,045 A | * | 12/1996 | Kaak | ............... | D01H 13/32 57/264 |

(Continued)

FOREIGN PATENT DOCUMENTS

| | | |
|---|---|---|
| DE | 40 08 794 A1 | 9/1990 |
| DE | 199 30 714 A1 | 1/2001 |

(Continued)

OTHER PUBLICATIONS

German Patent Office Search Report, dated Nov. 26, 2018.
EPO Search Report, dated Jul. 3, 2019.

*Primary Examiner* — Khoa D Huynh
*Assistant Examiner* — Grace Huang
(74) *Attorney, Agent, or Firm* — Dority & Manning, P.A.

(57) ABSTRACT

A method is provided for operating a spinning machine or winder that includes a plurality of same-kind workstations and a plurality of input terminals situated with the workstations. The method includes at least intermittently configuring at least one of the input terminals as a master terminal. Commands are entered for operation of all or a group of the workstations via the master terminal. Designation of the master terminal is changed to one or more different ones of the input terminals at different points in time. A spinning machine or winder that practices the method is also provided.

7 Claims, 1 Drawing Sheet